United States Patent [19]

Nakazawa et al.

[11] Patent Number: 4,883,284
[45] Date of Patent: Nov. 28, 1989

[54] POSITION DETECTING DEVICE FOR A MOTORCYCLE SIDE STAND

[75] Inventors: Yoshihiro Nakazawa; Masayuki Kudou; Satoshi Iijima; Katsuiki Sanada; Yoshihiro Matsuo, all of Saitama, Japan

[73] Assignee: Honda Giken Kogyo Kabushiki Kaisha, Tokyo, Japan

[21] Appl. No.: 267,267

[22] Filed: Nov. 4, 1988

[30] Foreign Application Priority Data

Dec. 25, 1987 [JP] Japan .................. 62-331582

[51] Int. Cl.⁴ .............................. G62H 1/02
[52] U.S. Cl. ..................... 280/293; 180/219; 280/763.1
[58] Field of Search ............. 280/763.1, 243, 301, 280/302, 303; 180/219

[56] References Cited

U.S. PATENT DOCUMENTS 4,638,880 1/1987 Togashi ........................ 280/301
4,671,374 6/1987 Kouyama et al. ............. 280/301

FOREIGN PATENT DOCUMENTS 2913429 10/1980 Fed. Rep. of Germany ...... 280/293
58-9886 1/1083 Japan .
48-12924 4/1973 Japan .

Primary Examiner—Kenneth R. Rice
Attorney, Agent, or Firm—Lyon & Lyon

[57] ABSTRACT

A switch for detecting various angular positions of a motorcycle side stand bar is a rotary switch so arranged that a movable contact therein is moved with respect to stationary contacts in response to movement of the side stand bar whereby the position of the side stand bar can be detected while the switch can be advantageously positioned to permit greater freedom of switch design and installation and protection of the side stand pivot member. Various switch configurations and modes of attachment are disclosed, as well as various modes of electrical application of the switch in the operation of the vehicle.

23 Claims, 18 Drawing Sheets

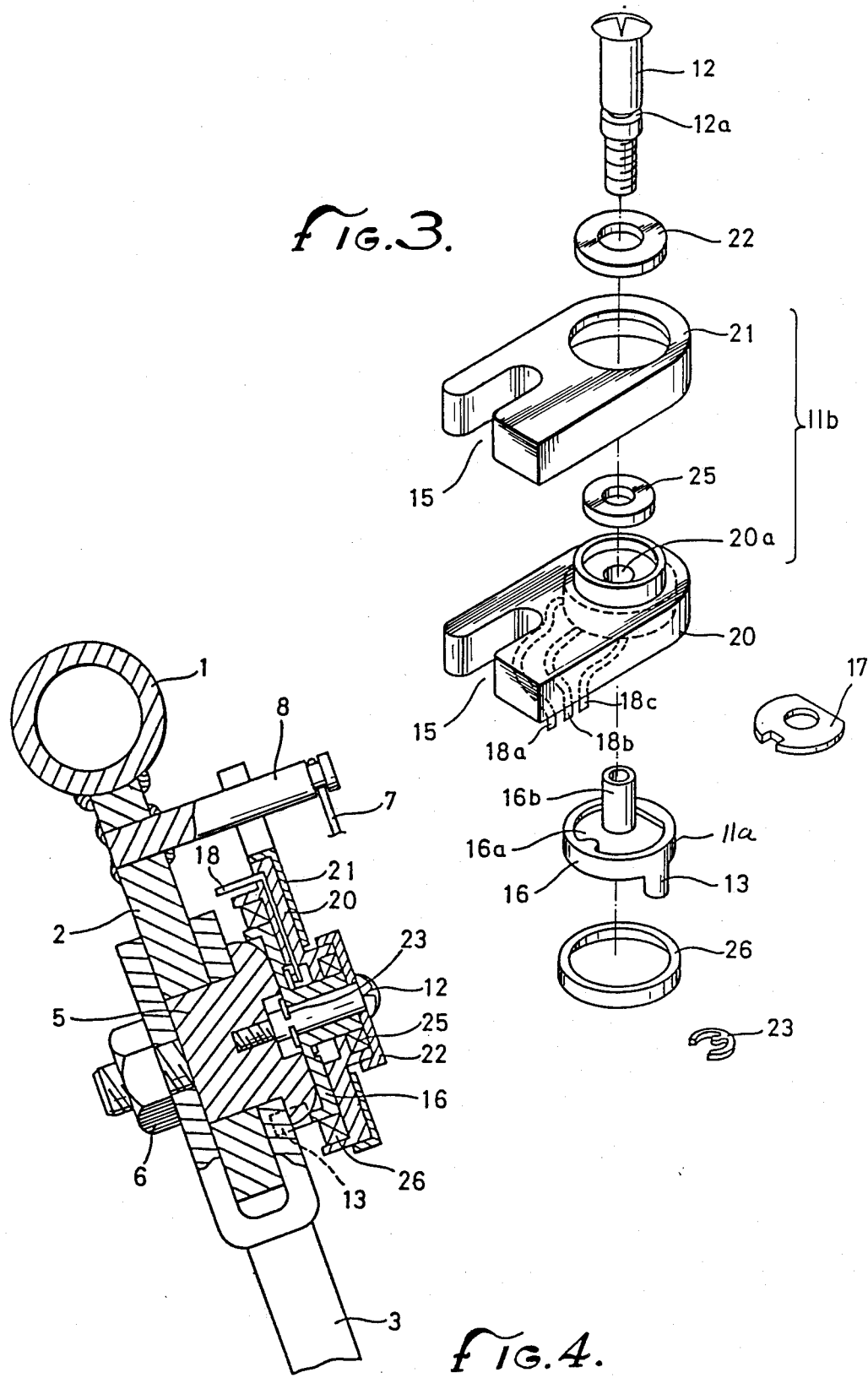

Fig. 11.(A)
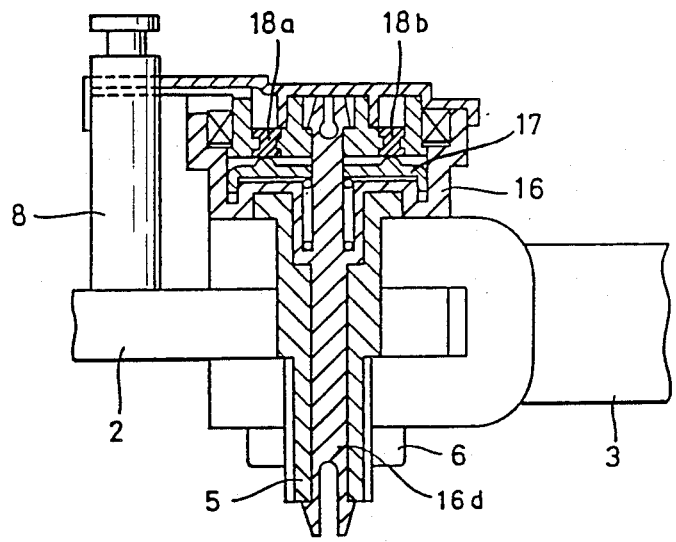
Fig. 11.(B)
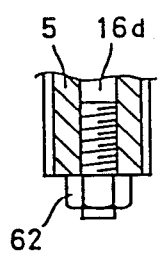
Fig. 11.(C)
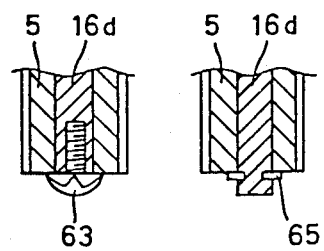
Fig. 11.(D)

FIG. 16.(A)
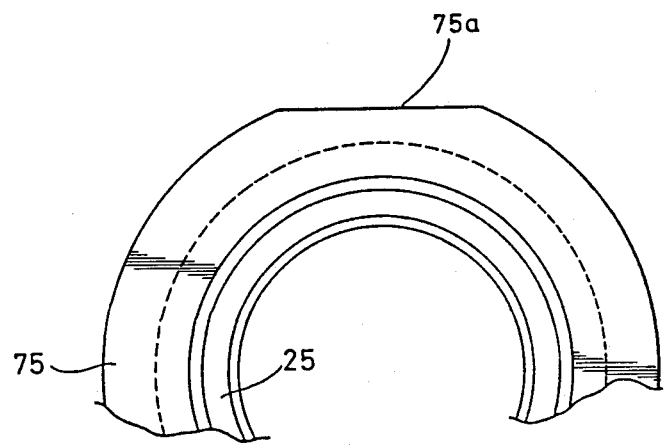
FIG. 16.(B)
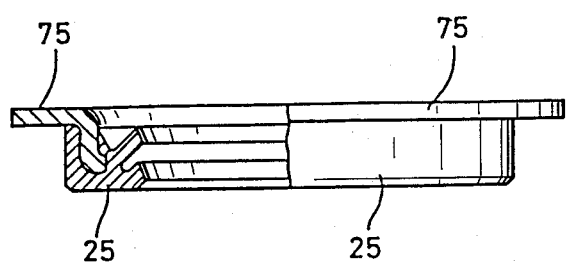
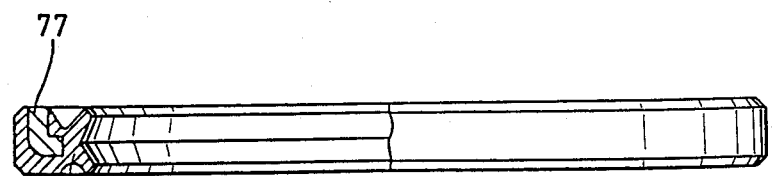
FIG. 17.

POSITION DETECTING DEVICE FOR A MOTORCYCLE SIDE STAND

BACKGROUND OF THE INVENTION

The present invention relates to a side stand for a vehicle, and more particularly, to a condition-detecting device for a side stand in a vehicle, such as a motorcycle, or the like. Vehicles, such as motorcycles, or the like, often include a device which is adapted to detect the position of the side stand. Such a device has been proposed, for example, in the structure as disclosed in the specification of Japanese Utility Model Laid-Open No. 58-9886 (No. 9886/1983).

This device, as shown in FIG. 24 hereof, comprises a bracket 202 provided on a vehicle body frame 201; a base portion of a side stand pivotably mounted by bolt 204 on the bracket 202; an end face 203a of the base portion formed in a cam shape; and a push button 206 of a switch 205 adapted to abut the end face 203a whereby, when the side stand 203 is allowed to swing from its standing condition to its receiving condition, or from the receiving condition to the standing condition, the button 206 is pushed by the end face 203a so as to actuate a lamp or buzzer, or the like. In such a device, since the switch 205 and the base portion of the side stand are arranged in substantially the same plane of the side surface of the bracket 202, and the base portion of said side stand has a shape protruding as a cam surface in the plane, the area which contains the switch 205 is limited, whereby there is inconvenience that freedom of design and installation is limited.

A side stand for a motorcycle is also shown in the specification of Japanese Utility Model Publication No. 48-12924 (No. 12924/1974). In the side stand shown in this specification, the side stand bar is pivotably mounted so as to be rotatable with respect to a bracket provided on the vehicle body and a return spring is spanned between the bracket and the side stand bar. The latter is energized under the tension of the return spring in either of a receiving position or a projecting position on opposite sides of a neutral position, that is, a dead point, and is capable of being stably located at one of such positions. Here, the "receiving position" means the retracted position in which the side stand bar is pivoted upwardly and folded along the vehicle frame, or the like. The "projecting position" means the extended position of the side stand bar in which the side stand bar is disposed with respect to the vehicle frame so as to support the vehicle body.

On the bracket of such side stand is provided a switch which comes into an electrically conducting condition only when the side stand bar is in the receiving position thus to detect that position of the side stand bar. This switch is utilized as a switch controlling the current supply to an engine ignition circuit, and is intended to interrupt the current supply to the latter when the side stand bar exists in a position other than the receiving position.

However, in this prior art side stand device, the switch is of the push type, having a push rod utilized as a switch, and it is organized such that the push rod is pressed by the side stand bar when the bar reaches the receiving position whereby the switch is turned on. The layout of the switch and the push rod in order to permit their effective operation is limited. Consequently, freedom of design and installation of these elements is restricted.

SUMMARY OF THE INVENTION

It is, accordingly, an object of the invention to provide a condition-detecting device for a motorcycle side stand in which freedom of design and installation of the switch is improved and in which the head of the fastener pivotably mounting the base portion of the side stand is protected.

In order to attain the above-mentioned objects, according to the present invention, the side stand for a motorcycle is characterized in that a switch for detecting the respective angularly spaced positions of the side stand bar is constituted as a rotary switch including a movable contact associated with the rotation of the side stand bar with respect to the side stand bracket, and a stationary contact which makes electrical contact with the movable contact by being positioned adjacent the position in which the side stand bar has been rotated from the receiving position to the projecting position by a predetermined angle of rotation.

In order to attain another object of the invention, the present device is characterized, in a vehicle, such as a motorcycle, or the like, which is adapted to pivotably mount the base portion of a side stand by a bolt on a bracket mounted on the vehicle body frame, in that the switch is disposed laterally on the base portion of the side stand and that an enlarged portion of the base portion is formed to surround the head of the bolt from one side of the base portion of the side stand on the switch side. An engaging portion is formed at an end of the enlarged portion and the switch is connected to the engaging portion. A cover that extends to the expanding portion is provided on the switch. Since the switch is disposed laterally on the base portion of the side stand, it is possible to improve the freedom of installation of the switch. Also, since the bolt, which was intended to pivotably mount the base portion of the side stand on the bracket, is surrounded by the enlarged portion and the cover, it is possible to improve protection of the bolt.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 3 is an exploded perspective view showing a rotary switch device according to the present invention;

FIG. 4 is an enlarged partial cross sectional view showing the motorcycle side stand according to the present invention;

FIGS. 11(A) through 11(D), 12 and 13 are partially enlarged cross sectional views showing alternative fastenings for the rotary switch to motorcycle side stands according to the present invention;

FIGS. 16(A) and 16(B) are a plan view and a partial cross sectional view, respectively, showing the oil seal shown in FIG. 15(A);

FIG. 17 is a partial cross sectional view showing another oil seal shown in FIG. 15(A);

DESCRIPTION OF THE PREFERRED EMBODIMENTS

Figure 1:
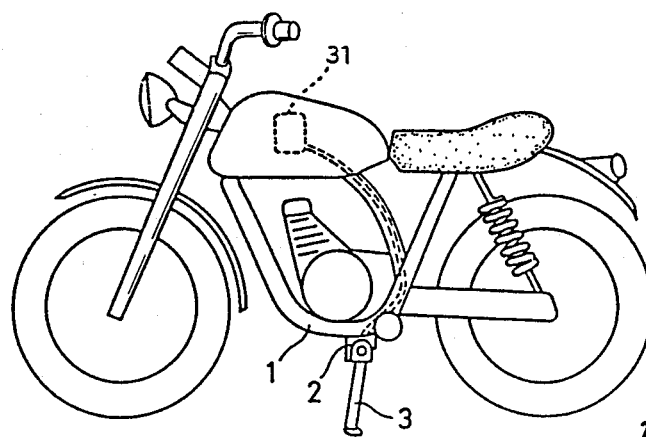
FIG. 1 is a side view of a motorcycle incorporating a side stand according to the present invention.
Figure 2:
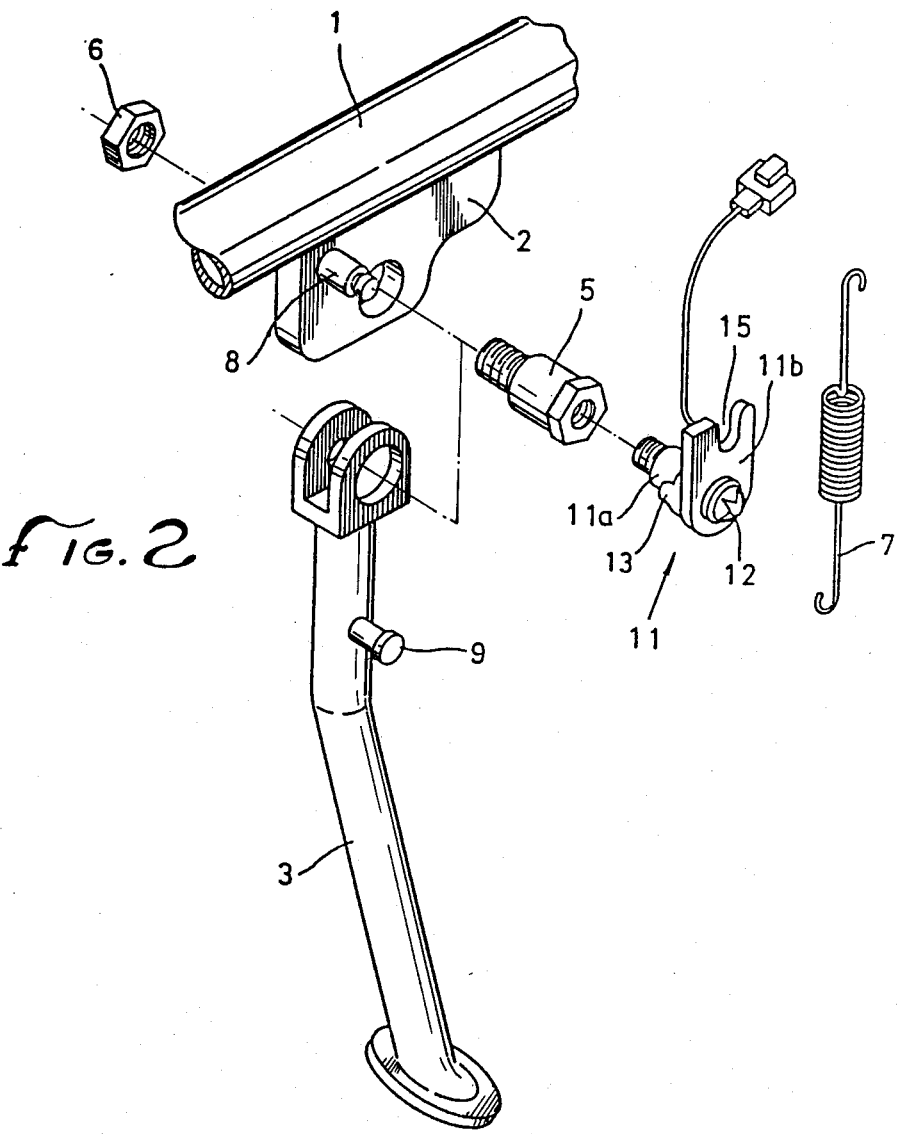
FIG. 2 is an exploded perspective view showing the motorcycle side stand according to the present invention.

In the motorcycle of FIG. 1, a plate-like side stand bracket 2 is fixed by welding to a lower frame pipe 1 of a vehicle. On the side stand bracket 2 is pivotably mounted a side stand bar 3. As shown in FIG. 2, the upper end portion of the side stand bar 3 is formed in a "U" shape, between the legs of which the bracket 2 is inserted. The bracket 2 and the bar 3 are clamped together by means of a pivot bolt 5, about which the bar 3 is pivotable. Also, loosening of the pivot 5 that is screw-threaded into the upper end portion of the side stand bar 3 is prevented by a lock nut 6. Further in FIG. 1, reference numeral 31 indicates a spark unit which will be described hereinafter.

The bracket 2 and the bar 3 have hook pins 8 and 9, respectively, for engaging end portions of a return spring 7. The latter is a spring which is adapted to energize the side stand bar to either a retracted, receiving position or an extended, projecting position, with a neutral position, that is, a dead point, therebetween and to stabilize the side stand bar in each position.

A rotary type of switch device 11 for detecting the angularly spaced positions of the side stand bar 3 rotating about the pivot bolt 5 comprises a rotating portion 11a that moves together with the bar 3 and a stationary portion 11b fixed to the bracket 2. The rotating and the stationary portions 11a and 11b are capable of rotating relative to each other about the axis of a screw 12 passing through them. The switch device 11 is mounted on the head of the pivot bolt 5 by threading the screw 12 into the bolt 5. In this case, the rotating portion 11a is capable of rotating together with the bar 3 by allowing two positioning projections 13 (only one of which is shown in FIG. 2) to engage with both front and rear end portions of the upper end portions of the bar 3. The stationary portion 11b is fixed by allowing its "U" shaped groove 15 to engage the hook pin 8 provided on the bracket 2.

FIGS. 3 and 4 show an exploded view and a cross sectional view, respectively, of the switch device. The rotating portion 11a of the switch device 11 that rotates together with the bar 3 is formed of an insulating material and comprises a contact holder 16 on which the positioning projection 13 is formed, and by a contact plate 17 fitting into a recess 16a of the contact holder 16. The contact plate 17 is formed by a conductor, and at the center of the contact holder 16 is formed a cylindrical boss portion 16b that extends through an opening in the contact plate 17. Also, the stationary portion 11b of the switch device 11 fixed to the bracket 2 consists of a base 20 which is obtained by integrally molding contacts 18a, 18b and 18c that resiliently extend from an insulating material, and a cover 21 formed from a steel plate to cover and protect the base 20. On the base 20 are formed a "U" shaped groove 15, which engages with the hook pin 8 of the bracket 2, and a hole 20a through which the boss portion 16b of the contact holder 16 is passed. On the cover 21 is formed a "U" shaped groove 15 corresponding to the groove on the base 20.

The switch device 11 is so assembled that the screw 12 carrying a washer 22 penetrates the boss portion 16b of the contact holder 16 which is inserted into the hole 20a of the base 20 and that an "E" clip 23 is fitted into a clip groove 12a provided on the screw 12. Further, oil seals 25, 26 are press fitted, respectively, between the base 20 and the boss portion 16b of the contact holder 16, and between the base 20 and a large diameter portion of the contact holder 16, whereby liquid tightness is adapted to be kept in an inner space in which the contact plate 17 and the fixed contacts 18a, 18b and 18c are disposed.

Figure 5:
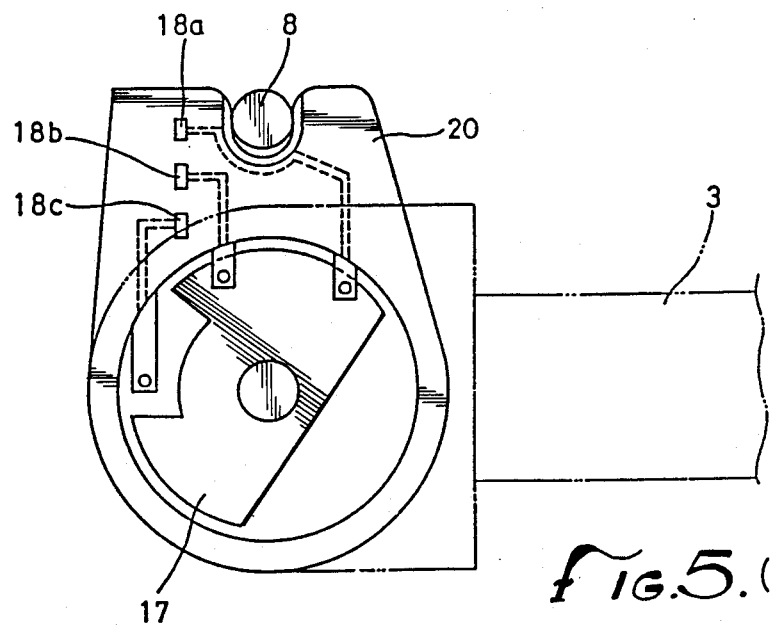
FIGS. 5(A), 5(B) and 5(C) are views showing various positions of actuation of the rotary switch device shown in FIG. 3.
Figure 5:
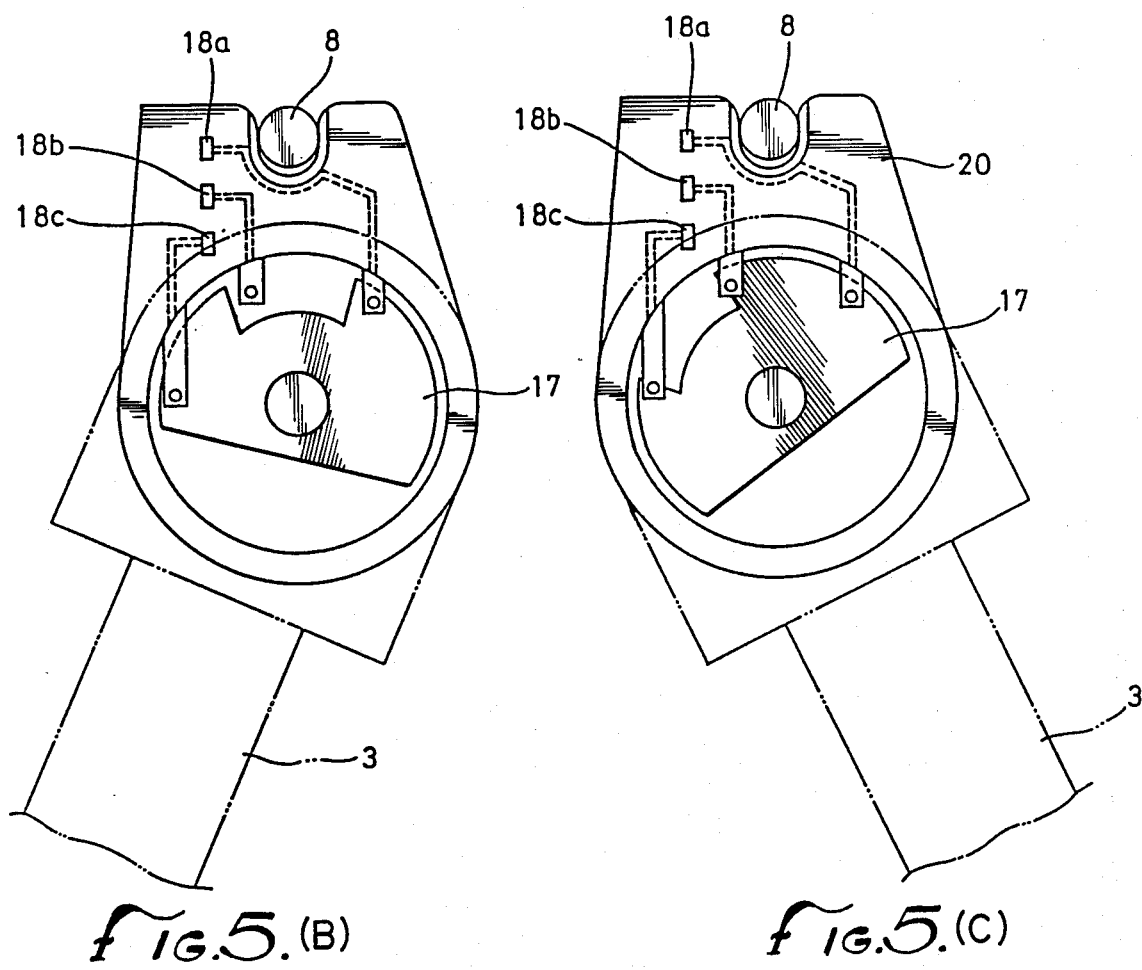

The following description is made of actuation of the described switch device 11 with reference to FIGS. 5(A), 5(B) and 5(C). The contact plate 17 slidingly contacting with the fixed contacts 18a, 18b, 18c is carried by the contact holder 16 and is adapted to rotate together with the side stand bar 3. The contact plate 17 has a shape including a cut-away portion at a part of a generally semicircular shape, and as shown in FIG. 5(A), when the side stand bar 3 is in the receiving position the fixed contacts 18a, 18b contact with the contact plate 17 and, therefore, are in an electrically conductive state via the contact plate 17. Also, at this time, the fixed contact 18c is isolated and is in an "OFF" state.

When the side stand bar 3 is allowed to rotate downwardly and reaches the neutral position, as shown in FIG. 5(B), the fixed contact 18c abuts the contact plate 17 so that electrical continuity is maintained between the fixed contacts 18a and 18b, whereby the fixed contacts 18a, 18b and 18c come into the "ON" state with respect to each other via the contact plate 17. Further, when the side stand bar 3 is allowed to rotate downwardly and reaches the extended projecting position, the fixed contact 18b separates from the contact plate 17 by bordering the neutral position of the side stand bar 3 so as to isolate from the contact plate 17, the fixed contact 18b coming into a state insulated from any contact, that is, an "OFF" state. As a result, the fixed contacts 18a and 18c continue to abut the contact plate 17, whereby the "ON" state for these contacts is maintained.

Further, the relationship between the contact plate 17 with the fixed contacts 18a, 18b, 18c and the rotating position of the side bar stand 3 is capable of being altered by modifying the shape of the contact plate 17 or the arrangement of the fixed contacts 18a, 18b, 18c.

Furthermore, the neutral position of the side stand bar 3 is determined by the relationship of the relative positions between the hook pin 8 and the pivot bolt 5. Accordingly, if the fixed portion 11b of the switch device mounted on the pivot pin 5, as in the present embodiment, is engaged with the hook pin 8 so as to prevent the fixed portion 11b from rotating with respect to the bracket, the switch device 11 always operates to be turned on and off by bordering the respective angularly spaced positions of the side stand bar 3 as it rotates in either direction by the predetermined angle of rotation from the neutral position, as long as the relationship of the relative position of the hook pin 8 to the pivot bolt 5 does not change. This result also occurs in a case where it is applied to a motorcycle in which the receiving position and the projecting position of the side stand bar with respect to the pivot bolt 5 differ. Therefore, the side stand in this embodiment has extensive usefulness and can be easily applied to various types of motorcycles.

Figure 6:
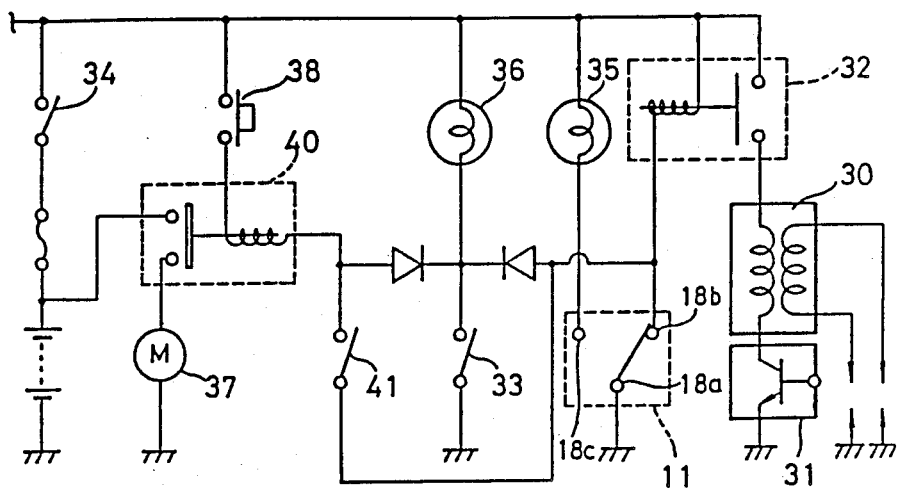
FIGS. 6(A) and 6(B) are circuit diagrams showing two forms of engine ignition and starting circuit usable with the invention.
Figure 6:
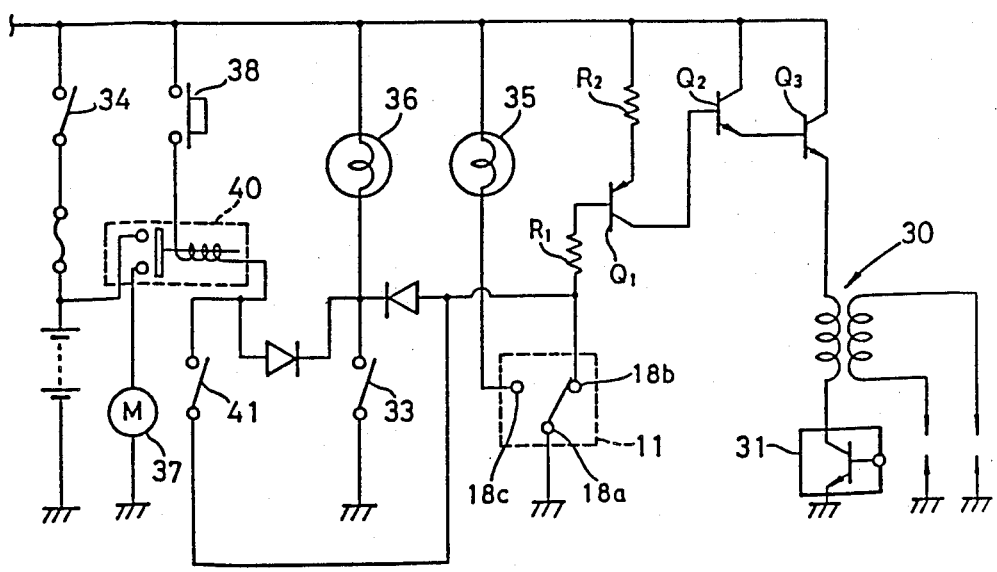

FIGS. 6(A) and 6(B) show circuits for effecting an ignition cut-off of an engine carried on the vehicle by utilizing the switch device 11 mentioned above. The ignition circuit, represented by an ignition coil 30 and a spark unit 31, is adapted to supply current and ignite only when an ignition relay 32 is in its conductive condition, the ignition relay 32 being adapted to function as a normally open switch. The ignition relay 32 is actuable for effecting ignition only when the fixed contact 18a and 18b of the switch device 11 mounted on the side stand are in the "ON" state. This occurs when the side stand bar 3 is disposed in a range from the receiving position to the neutral position, as shown in FIGS. 5(A) and 5(B), or only when the neutral switch 33 is in its "ON" state, the neutral switch 33 being adapted to turn on when the shift position of the transmission (not shown) is in neutral. Accordingly, in operating conditions other than the neutral position of the transmission shift, if the side stand bar 3 exists in the extended projecting position rather than in the neutral position, the fixed contacts 18a, 18b are in the "OFF" state and the ignition relay 32 is deactuated since the neutral switch 33 is in its "OFF" state, whereby the circuit is incapable of effecting ignition and, therefore, the vehicle cannot travel. In this case, as shown in FIG. 5(C), since the fixed contacts 18a and 18c come into the "ON" state, a pilot lamp 35 turns on so as to indicate that the side stand bar 3 is in the projecting condition. Further, when the neutral switch 33 is in the "ON" state, a pilot lamp 36 is adapted to turn on so as to indicate that the shift position of the transmission is in the neutral position.

Consequently, the starter circuit for operating the starter motor 37 for starting the engine, with a starter switch 38 controlling current supply to the starter motor 37 and the starter relay 40 is capable of driving the engine by means of the starter motor 37 only when the starter switch 38 and the starter relay 40 are in their "ON" states. The starter relay 40, being a normally open switch, comes into its "ON" state only when the starter switch 38 is activated to its "ON" state and is thereby adapted to supply current to the starter motor 37. The starter switch 38 comes into its "ON" state when the fixed contacts 18a, 18b and a clutch switch which comes into its "ON" state when the neutral switch 33 is in its "ON" state or, when the clutch is interrupted, are in their "ON" state together. That is, when the side stand bar 3 is disposed in the area from the neutral position to the projecting position, that is, in its extended supporting condition, if the neutral switch 33 is not in its "ON" state, the engine is incapable of starting. Reference numeral 34 in the drawing figure represents a main switch.

The circuit shown in FIG. 6(B), which may alternatively be employed, is formed as a non-contact circuit by replacing the ignition relay 32 used in the circuit shown in FIG. 6(A) with transistors $Q_1$, $Q_2$, $Q_3$ and resistors $R_1$, $R_2$. Further description of FIG. 6(B) will be omitted since the remaining structure is similar to that of FIG. 6(A).

Figure 7:
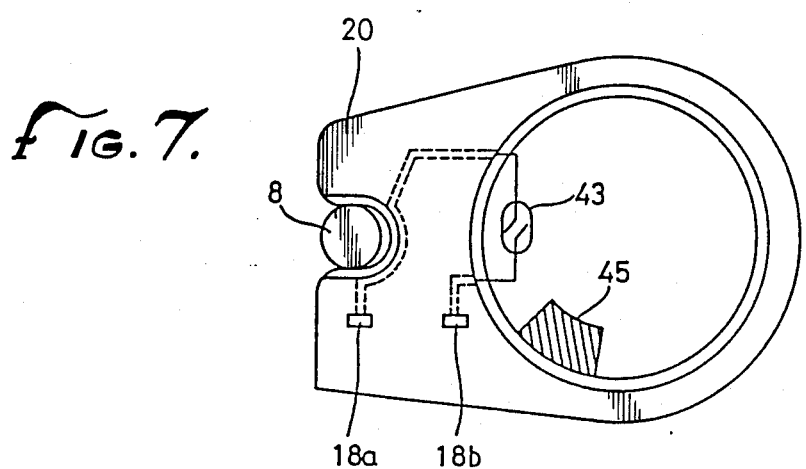
FIG. 7 depicts an alternative form of rotary switch device according to the present invention.

FIG. 7 shows another embodiment of the present invention which differs from the aforesaid embodiment in that the ends of the fixed contacts 18a, 18b are formed by a magnetic conductor so as to constitute a so-called "reed switch" 43. In this case, instead of having the contact plate 17, a magnet 45 pivots together with the side stand bar 3, and is so constituted that the reed switch 43 is activated by the magnetic force of the magnet 45 when the side stand bar 3 is in the region extending from the receiving position to the neutral position. Although the fixed contact 18c is omitted in FIG. 7, the reed switch 43 is provided between the fixed contacts 18a and 18c in the same manner as mentioned above and can be so constituted that it is activated to turn on when the side stand bar 3 is in the projecting condition.

Figure 8:
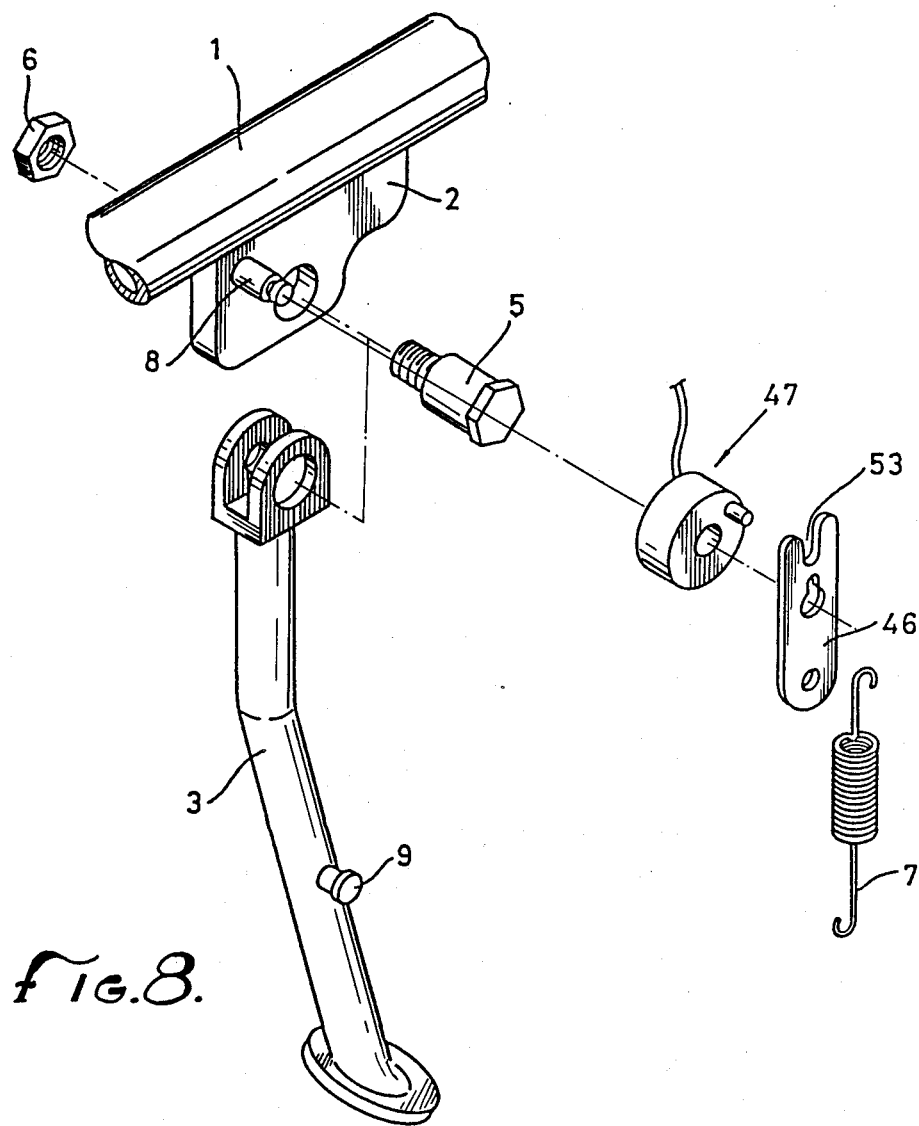
FIG. 8 is an exploded perspective view showing an alternative form of motorcycle side stand according to the present invention.
Figure 9A:
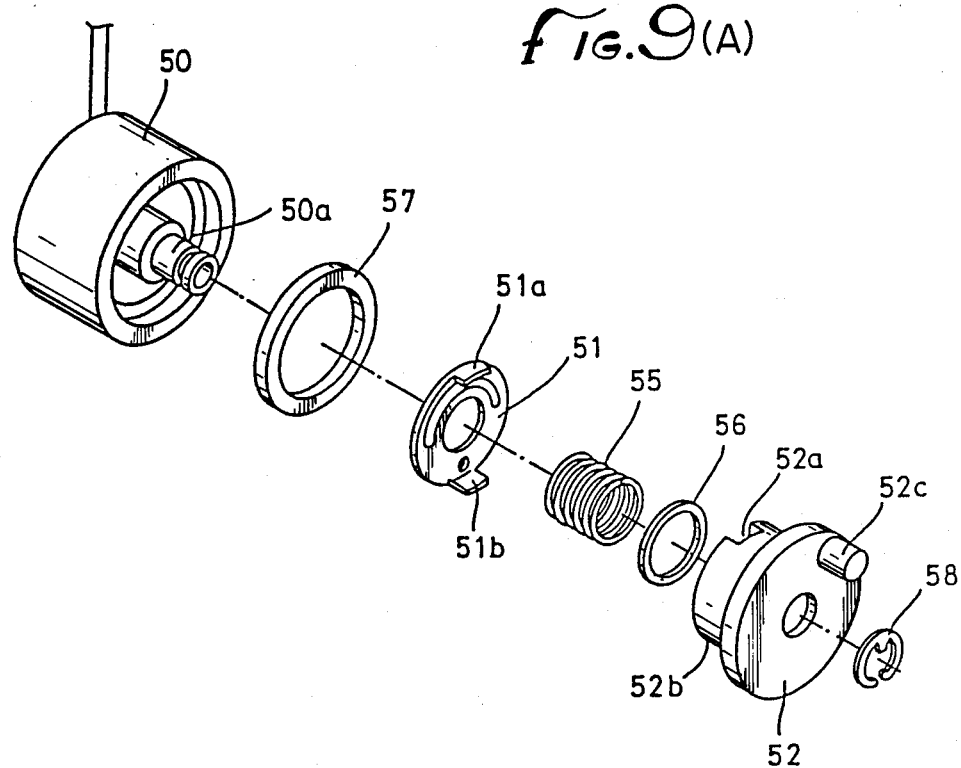
FIGS. 9(A) and 9(B) are exploded perspective views showing another form of rotary switch device according to the present invention.
Figure 9B:
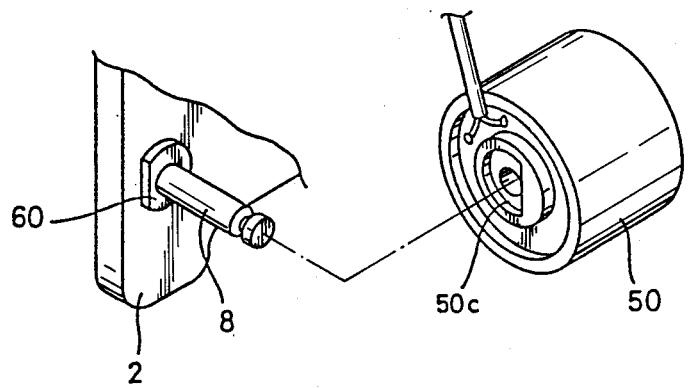
Figure 10:
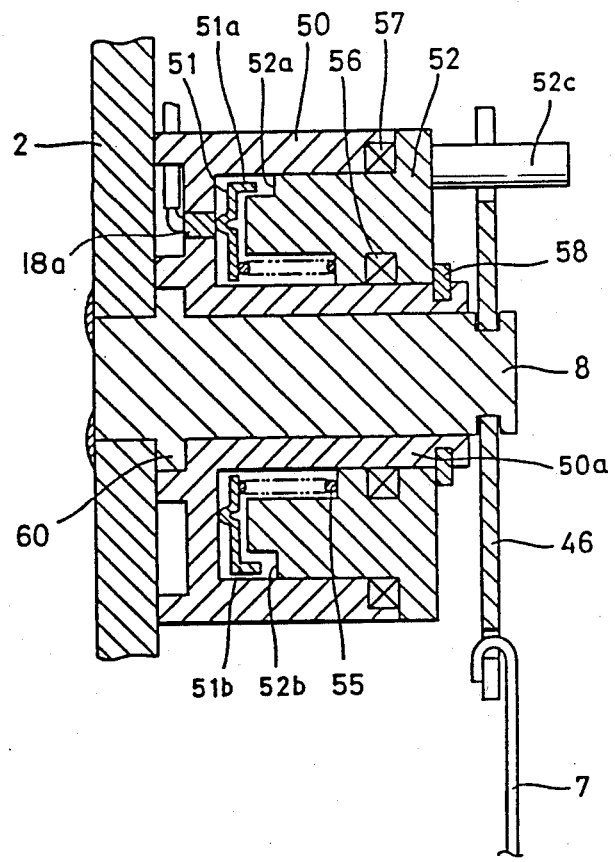
FIG. 10 is a view similar to FIG. 4 showing the rotary switch of FIGS. 9(A) and 9(B) installed on a motorcycle side stand.

Further, FIGS. 8 to 10 show an embodiment of the invention that differs from the embodiment described above. In the embodiment shown in FIG. 8, attention is directed to the fact that the return spring is associated with the rotation of the side stand bar 3 and rotates about the hook pin 8 whereby it is possible to detect the particular position of the side stand bar 3 since the corresponding position of the return spring 7 is indicative of this position. As shown, the return spring 7 is spanned between a hook plate 46 rotatably mounted on the hook pin 8 of the bracket 2 and the hook pin 9 of the side stand bar 3. A rotary type of a switch 47 for detecting the angular position of the return spring 7 is fitted into the hook pin 8 of the bracket 2 and is adapted to be disposed between the bracket 2 and the hook plate 46.

The switch device 47 is constructed as shown in FIGS. 9 and 10. That is, at a center portion of a switch case 50 formed in a generally cylindrical shape by integrally molding from an insulating material is provided a boss portion 50a, and at a bottom portion of the switch case 50 are provided fixed contacts 18a, 18b, 18c, only one of which is shown in FIG. 10. A rotary contact 51 capable of slidingly contacting the fixed contacts 18a, 18b, 18c is housed in the switch case 50. On the rotary contact 51 are formed engaging projections 51a and 51b which engage with recesses 52a, 52b, respectively, of a rotor 52 fitted into the switch case 50, whereby relative rotation between the rotating contact 51 and the rotor 52 is prohibited. To connect the spring 7 to the switch 47 the rotor 52 is provided with a projection 52c which engages a "U" shaped groove 53 formed on the hook plate 46. Between the rotating contact 51 and the rotor 52 is provided a spring 55 that telescopically surrounds the boss 50a. An appropriate contact force is adapted to be effected between the fixed contacts 18a, 18b, 18c and the rotary contact under the resilient force of the spring 55. Further, oil seals 56, 57 are press fitted between the rotor 52 and the boss portion 50a of the switch case 50, and between the rotor 52 and an outer cylindrical portion 50b of the switch case 50, respectively. By means of this, liquid tightness in ensured in the inner space which is formed by the switch case 50 and the rotor 52 and in which the fixed contacts 18a, 18b, 18c and the rotary contact 51 are arranged.

After the parts 51, 52, 55, 56, 57 have been arranged in the switch case 50, the switch device 47 is assembled by fitting an "E" clip 58 into a groove in a leading end of the boss portion 50a. On the backside of the bottom of the switch case 50 is formed a recess 50c which fits into a semicircular flat portion 60 provided on a base portion of the hook pin 8 of the bracket 2. When the switch device 47 is fitted into the hook pin 8 and is mounted on the bracket 2, the switch case 50 is adapted to be fixed so as to be incapable of rotating with respect to the bracket 2. Accordingly, since the rotor 52 is engaging with the "U" shaped groove 53 of the hook plate 46 by its projection 52c, it is allowed to rotate according to the rotation of the return spring 7 thereby allowing relative rotation with respect to the switch case 50. The rotary contact 51 rotating together with the rotor 52 causes the fixed contacts 18a, 18b, 18c to turn on and off in the same manner as that described in connection with the embodiment of FIG. 5.

Further, in the embodiment shown in FIG. 4, the switch device 11 is adapted to mount on the head of the pivot bolt 5 by threading the screw 12 into the head of the pivot pin 5. However, as shown in FIG. 11(A), the switch device 11 may be fixed to the pivot bolt 5 by forming a rod-like portion 16d passing through the pivot bolt 5 on the contact holder 16 and by forming an engaging portion 16e engaged with an end face of the pivot bolt 5 on a leading end of the rod-like portion 16d. Alternatively, as shown in FIG. 11(B), a nut may be screwed on the leading end of the rod-like portion 16d, or as shown in FIG. 11(C), a screw 63 may be screwed into the leading end of the rod-like portion 16d. Further, as shown in FIG. 11(D), a "C" clip 65 may be fitted on the leading end of the rod-like portion 16d.

Figure 12:
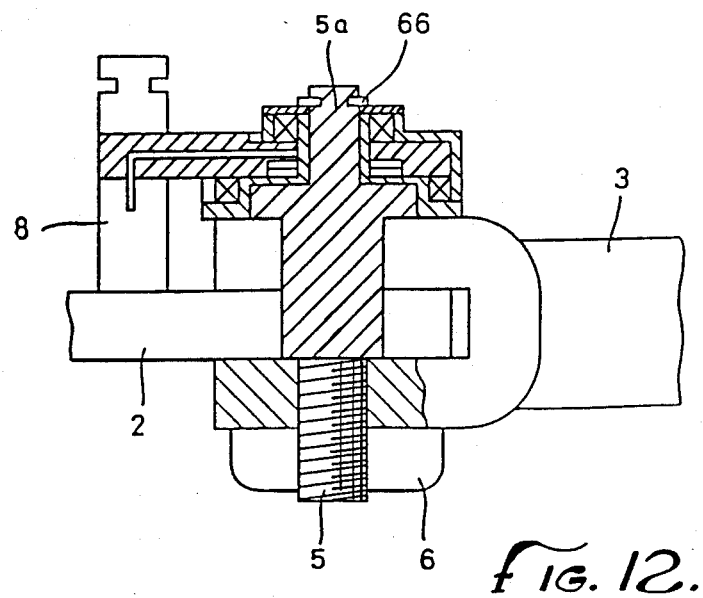

Also, in the embodiment shown in FIG. 4, the switch device 11 is adapted to be fixed on the head of the pivot bolt by means of the screw 12. However, as shown in FIG. 12, the switch device can be fixed by forming a boss portion 5a on the head of pivot bolt 5, passing the boss portion 5a through the switch device, and by fitting a "C" clip 66 on a leading end portion of the boss portion 5a.

Figure 13:
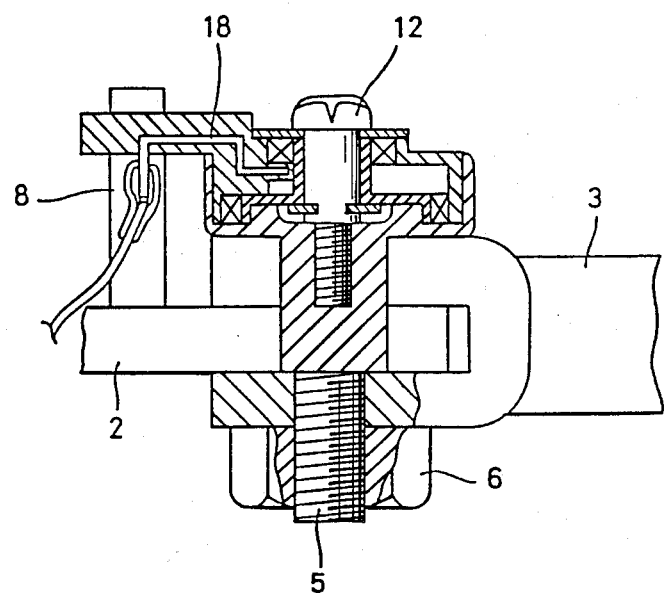
Figure 14:
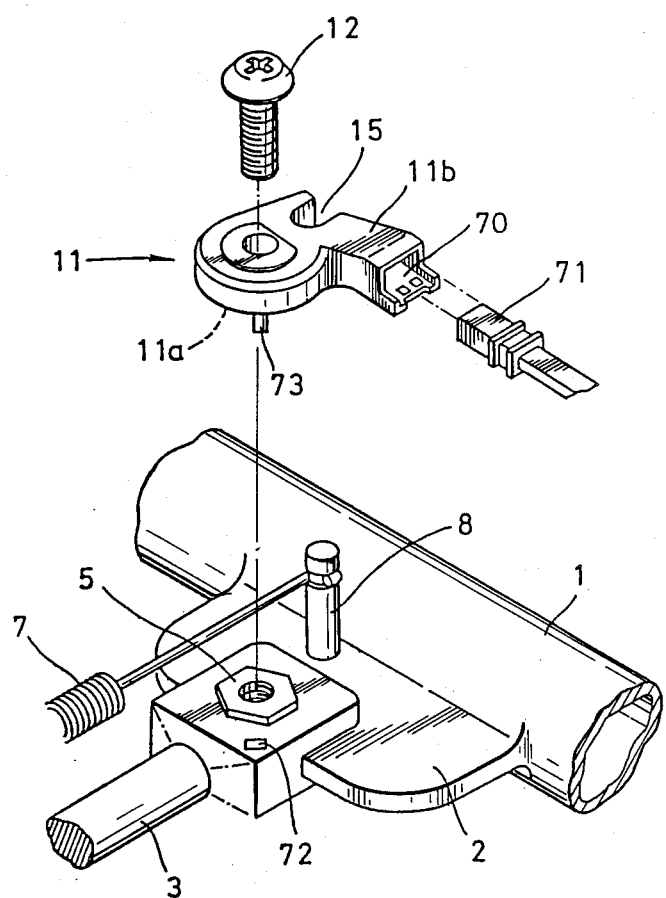
FIG. 14 is an exploded perspective view showing another form of a motorcycle side stand according to the present invention.
Figure 15:
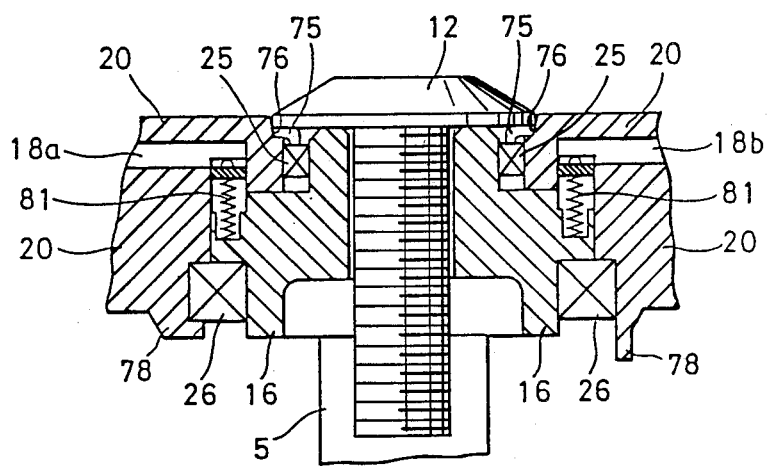
FIG. 15(A) is a partial enlarged cross sectional view showing the motorcycle side stand shown in FIG. 14.
FIG. 15(B) is a perspective view showing the shape of the movable contact shown in FIG. 15(A)
Figure 15:
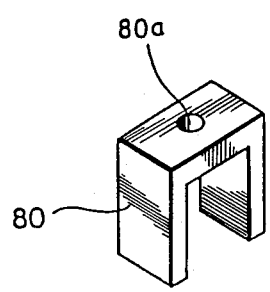

Further, as shown in FIG. 13, the head of the pivot bolt 5 may be used as a switch case. Such arrangement is preferable, since the switch case can be made to have a high rigidity and it leads to a reduction in required the number of parts.

Furthermore, in the embodiments mentioned above, as apparent from FIG. 4, the switch devices 11 and 47 are arranged on the upper surface of the bracket 2 outside of the vehicle and directed inclinedly upwardly at the side of the vehicle. The switches are thereby protected by the bracket 2 from mud and small stones thrown by the front wheel.

FIGS. 14 to 18 show another embodiment of the present invention. In this embodiment, a socket 70 is formed in a member 11b fixed to a bracket 2 of the switch device 11. A waterproof type of connector plug 71 is adapted to be inserted into the socket 70. On the portion 11a that rotates with the bar 3 is provided an engaging projection 73 which engages in an engaging bore 72 formed at the upper end of the bar 3.

Also, as apparent from FIG. 15(A) and FIGS. 16(A) and 16(B) showing respectively sectional shapes of the switch device 11, an oil seal 25 is reinforced by a reinforcing ring 75 of metal. This makes it possible to improve seal performance due to the fact that deformation and destruction of the seals are suppressed. The reinforcing ring 75 extends on the outer periphery of the upper surface of the oil seal 25 and is formed in a flange shape. A flat cut-away portion 75a is provided on a part of the outer periphery formed in the flange shape. A recess 76 corresponding to the shape of the reinforcing ring 75 is formed on the base 20 constituting the fixed portion 11b of the switch device 11. Rotation of the oil seal 25 with respect to the base 20 is prevented by the reinforcing ring 75 being fitted into the recess 76. Further, the portion of the reinforcing ring 75 formed in the flange shape is adapted to be interposed between the lower surface of the screw 12 and the base 20 and, when the screw 12 is tightened, performs a function as a washer.

Also, an oil seal 26 provided between the base 20 and the large diameter portion of the contact holder 16 is reinforced by a reinforcing ring 77 shown in FIG. 17. Further, the oil seal 26 is fixed on the base 20 by caulking a projection 78 formed as shown in the right side of FIG. 15(A) over the entire periphery as shown in the left side of FIG. 15(A), whereby the oil seal 26 is prevented from falling out.

Figure 18:
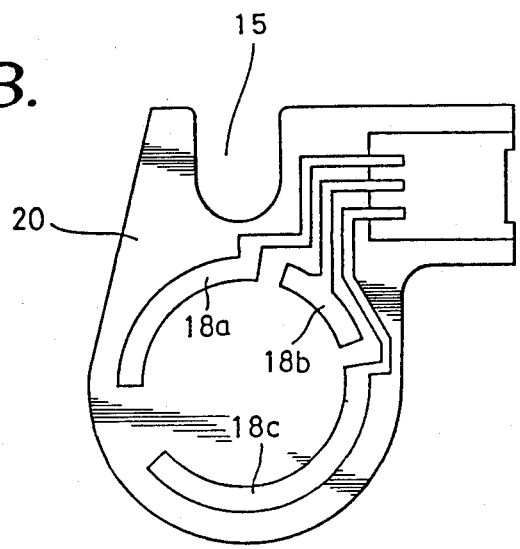
FIG. 18 is a schematic view showing an arrangement of fixed contacts in the rotary switch illustrated in FIG. 14.
Figure 19:
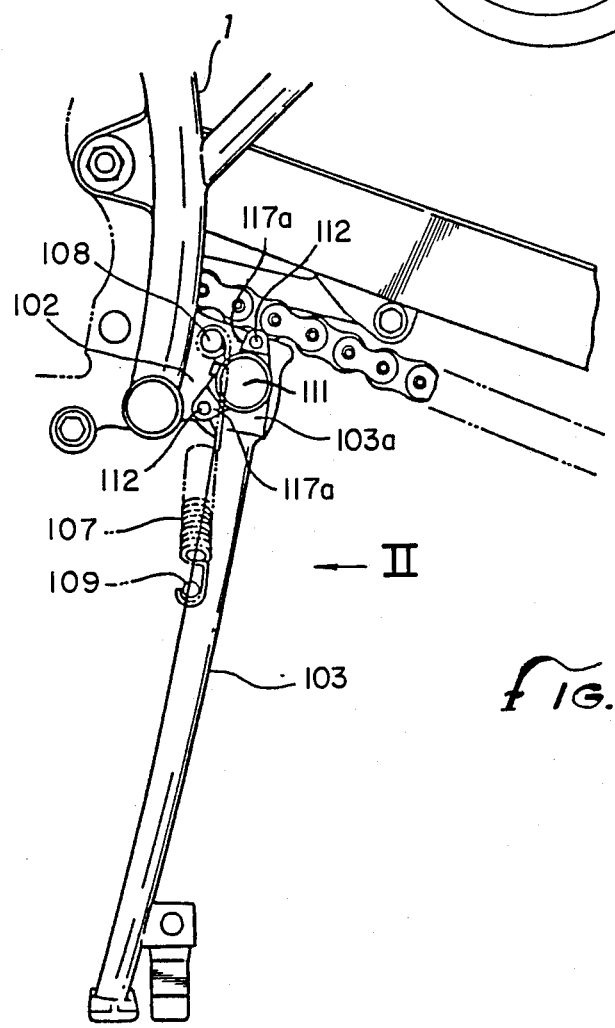
FIG. 19 is a side view of another form of a motorcycle side stand according to the present invention.

Further, in this embodiment, as shown in FIG. 18, ends of fixed contacts 18a, 18b, and 18c integrally molded with the base 20 and facing the contact holder 16 are arranged to extend in a peripheral direction, and the contact holder 16 is formed from a conductive metal. On the contact holder 16 are carried three movable contacts 80, instead of the contact plate 17 shown in FIG. 3. The movable contact 80 is formed in a substantially inverted "U" shape has shown in FIG. 15(B), and is energized by urging the surface on which a convex portion 80a is formed to the fixed contacts 18a, 18b, 18c by means of a set spring 81 provided telescopically.

Also, it is desirable, in order to prevent the screw 12 from loosening, to apply an adhesive such as nylon powder, or the like, on the thread portions thereof.

Since the remaining structure and its function are similar to that of the embodiment shown in FIGS. 2 to 4, the description thereof is omitted.

Further, the switch devices 11 and 47 may be provided on either an upper surface or a lower surface of the bracket 2, but as shown in FIG. 4, it is preferable to have the switch devices 11 and 47 arranged on the upper surface of the bracket 2 which is the side thereof that is slanted upwardly and facing outwardly because, so disposed the switch devices are protected by the bracket mud, small stones or other debris that may be flung by the front wheel.

As explained previously, in the side stand for a motorcycle according to this aspect of the present invention, the switch for detecting the respective angularly spaced positions of the side stand bar is constituted as a rotary switch. It includes a movable contact associated with the rotation of the side stand bar with respect to the side stand bracket, and a stationary contact which makes electrical contact with the movable contact by means of its disposition adjacent the respective positions in which the side stand bar has rotated from its receiving position to its projecting position by a predetermined angle of rotation.

Figure 20:
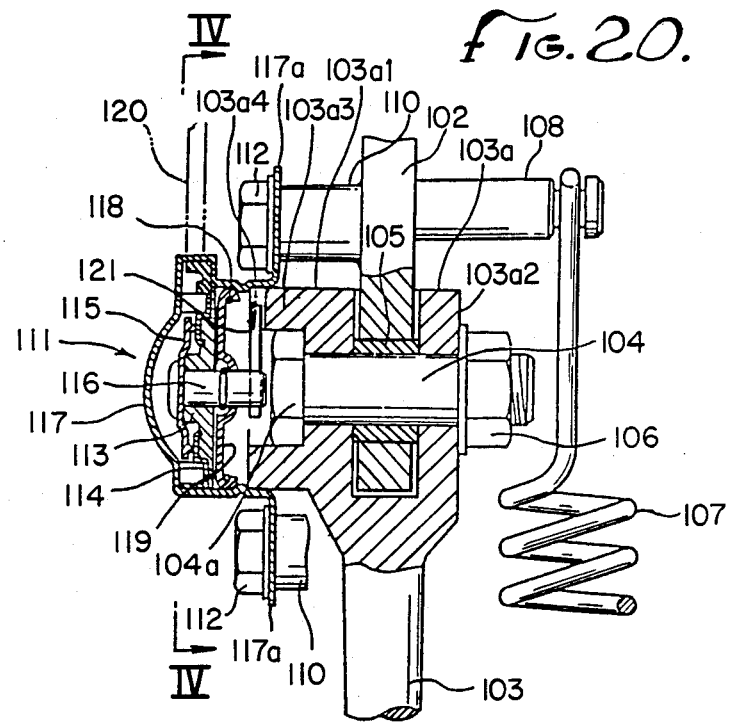
FIG. 20 is a partial sectional view seen in the direction of arrow II of FIG. 19.
Figure 21:
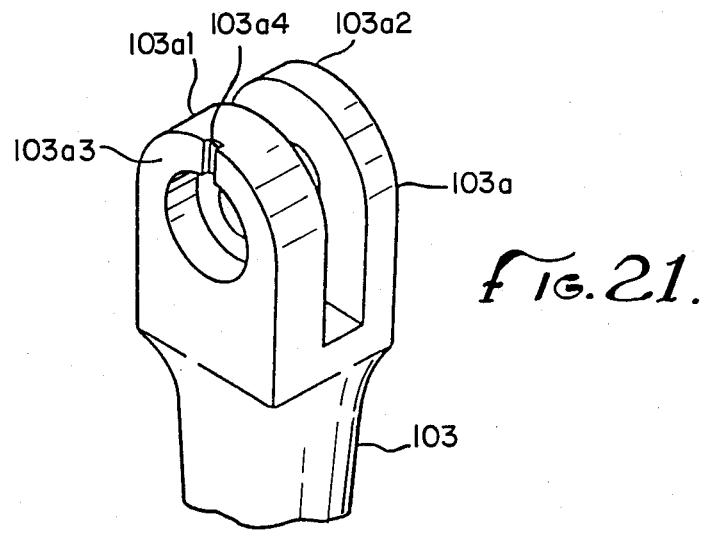
FIG. 21 is a perspective view showing the base portion of the motorcycle side stand of FIG. 19.
Figure 22:
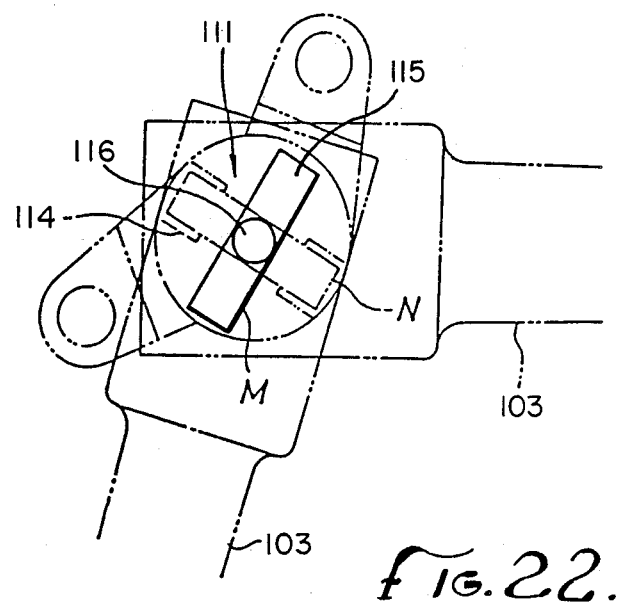
FIG. 22 is a sectional view taken along line IV—IV of FIG. 20.

In FIGS. 19 to 23 which illustrate another form of the invention, the reference numerals indicate a vehicle body frame at 101, a bracket welded to the vehicle body frame 101 at 102, and a side stand at 103. A base portion 103a of the side stand 103, as shown in FIG. 20, is formed in a fork shape having piece portions 103a1 and 103a2. These piece portions 103a1 and 103a2 are adapted to locate at opposite sides of the bracket. A bolt 4 is disposed to pass through the piece portions 103a1 and 103a2 and the bracket 102 whereby the base portion of the side stand is pivotably mounted on the bracket 102. Between the bolt 104 and the bracket 103 is inserted a sleeve 105, whereby, even if it is disposed to be tightly interposed at the base end of the side stand between the bolt 104 and a nut 106 screw threaded on the end of the bolt 104, an adequate clearance distance between the piece portions 103a1 and 103a2 of the side stand 103 is maintained so that the parts do not bind within the bracket 102.

Also, on the outside piece portion 103a1 is formed an expanding portion 103a3 which expands outwardly of the vehicle body and which surrounds the head of the bolt 104. On the outer surface of the expanding portion is formed an engaging groove 103a4.

On the backside of the bracket 102 is provided a projecting pin 108. Between the latter and a pin 109 provided in the middle of the backside of the side stand 103 is spanned a return spring 107 which is adapted to energize the side stand 103 toward the receiving position side or toward the standing position side. On the surface of the bracket 102 are formed projections 110 and 110 on which a rotary switch 111 is disposed so as to lie on the axis of the bolt 104.

The rotary switch 111 comprises a fixed contact 114, fixed to a base of epoxy resin which is an insulating material; a movable contact 115, which is adapted to rotate with respect to the fixed contact and which comes into a contact or a non-contact condition therewith so as to activate or deactivate the switch; and a rotating shaft 16, which is rotatably mounted on the base 113 and which is intended to rotate the movable contact 115. On the fixed contact 114 is integrally formed a cable-connecting portion on which a cable 120 is connected, the cable 120 being connected either to a warning device for indicating whether or not the side stand is retracted or to a battery, neither the latter nor the warning device being shown.

Outside of the rotary switch 111 is mounted a cover 117 which extends radially to the expanding portion 103a3 and which bulges outwardly. Flanges 117a and 117a are fixed to the projecting portions 110 and 110 by means of the bolts 112 and 112. Further, reference numeral 119 indicates a lid member which is fixed to an inner peripheral portion of the cover 117 by means of a circular clip 118.

The operation of the apparatus shown in FIGS. 19 to 23 is as follows. Firstly, when the side stand 103 is in the standing condition, the movable contact 115 lies in the position shown at "M" in FIG. 22, that is, in the "OFF" state with relation to the fixed contact 114. As a result of this, on a display device (not shown) it is indicated that the side stand 3 is not retracted into its normal receiving position. Next, when the side stand 103 is rotated and moved into the normal receiving position, the bolt and the expanding portion 103a3, together with the side stand 103, rotate integrally. As a result of this rotation, an engaging pin 121 engaging with the engaging groove 103a4 of the expanding portion 103a3 rotates in the same direction. By this, the movable contact 115 is rotated by the rotating shaft 116 and comes into the position shown at "N" in FIG. 4. As a result, the movable contact 115 electrically contacts the fixed contact 114, thereby leading to its "ON" state. In this case, the display device indicates that the side stand 3 is received in the normal receiving position. From this condition, if the side stand 103 is returned to the standing position, the rotating shaft 116 rotates in the opposite direction and returns the movable contact 115 again to the "M" position. It is thereby indicated by the display device that the side stand 103 is not in the receiving position.

As mentioned above, according to the present embodiment, the switch for actuating the warning device is formed as a rotary switch and the rotary switch 111 is disposed at a required distance from the base surface 103a of the side stand 103. Accordingly, there is nothing present near the side surface of the switch 111 to interfere with the switch and, therefore, such arrangement makes it possible to improve the freedom in design and installation of the switch.

Also, since the expanding portion 103a3 and the cover 119 of the switch 111 surround the bolt 104, it makes it possible to improve the protection of the bolt 104.

Figure 23:
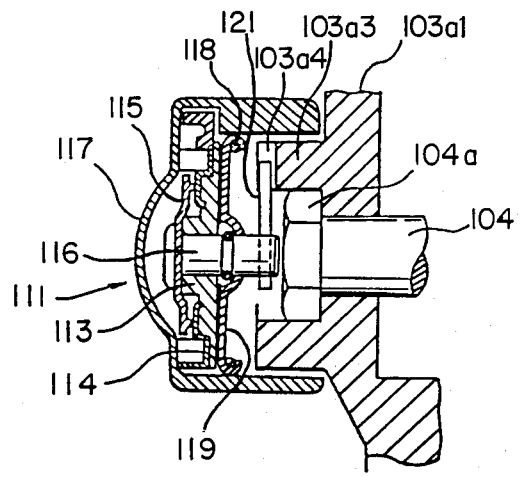
FIG. 23 is a sectional view showing another embodiment of the present invention.
Figure 24:
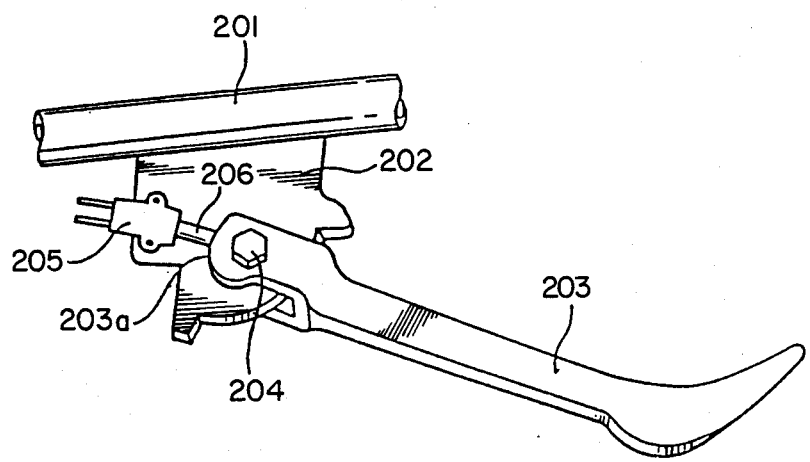
FIG. 24 is a perspective view showing a device of the prior art.

FIG. 23 shows another embodiment of the present invention in which the expanding portion 103a3 is surrounded by the cover 119 and a small gap is formed between the cover and the expanding portion 103a3, whereby, by a labyrinth effect, dust, or the like, is prevented from entering into the interior of the cover 119. Otherwise, the structure of this embodiment is similar to that of the previously described embodiment.

Further, the engaging portion 103a4 of the expanding portion 103 is shown to be formed as a groove, but this may be formed, alternatively, as a cam surface and the switch may be constructed to be actuated by this cam surface.

According to this aspect of the present invention, therefore, since the described switch is disposed laterally of the base surface of the side stand, it is possible to improve its freedom of installation. Also, since the expanding portion and the cover surround the bolt that pivotably mounts the base of the side stand on the bracket, protection of the bolt is improved.

It should be further understood that, although a preferred embodiment of the invention has been illustrated and described herein, changes and modifications can be made in the described arrangement without departing from the scope of the appended claims.

We claim:

1. A position detecting switch for use with a vehicle side stand mechanism that includes a mounting bracket attached to the frame of said vehicle and a side stand bar mounted on said bracket by a pivot for pivotal movement between a projecting position and a receiving position, said switch comprising:

stationary contact means fixed with respect to said mounting bracket; and movable contact means concentrically engageable with said stationary contact means and being movable coincident with said pivotal movements of said side stand bar.

2. The position detecting switch according to claim 1 in which said stationary contact means and said movable contact means are arranged in substantial concentric disposition about said axis of said pivot.

3. The position detecting switch according to claim 2 in which said movable contact means are mounted for movement with said side stand bar.

4. The position detecting switch according to claim 3 including cover means disposed in substantial axial alignment with said pivot overlying and substantially enclosing said stationary and movable contact means.

5. The position detecting switch according to claim 3 including spring means for biasing said side stand bar into said projecting position and said receiving position, respectively, and means for securing said stationary contact means against angular displacement with respect to said mounting bracket.

6. The position detecting switch according to claim 5 including a switch base fixed with respect to said mounting bracket, said stationary contact means being mounted in said switch base, a recess in said switch base, and an engaging pin attached to said stationary contact means and received in said recess.

7. The position detecting switch according to claim 1 in which said vehicle includes an electrically actuated display device and said side stand bar is pivotably movable to a neutral position intermediate said projecting position and said receiving position and wherein said stationary contact means comprises three angularly spaced contacts and said movable contact means comprises a contact plate configured to connect various of said stationary contacts in current-conducting relation in the respective of said side stand positions for activating said display device.

8. The position detecting switch according to claim 7 in which said contact plate is formed with an angularly disposed peripheral recess so disposed to permit said contact plate to effect the conduct of electric current between a different two of the three contacts with said side stand bar disposed in each of the respective projecting and receiving positions for electrically actuating the appropriate position-indicating display on said display device and to conduct current through the three stationary contacts when said side stand bar is in said neutral position.

9. The position detecting switch according to claim 7 in which said stationary contacts are operative in the starter circuit of said vehicle and arranged to prevent vehicle engine startup until said side stand bar is appropriately positioned.

10. The position detecting switch according to claim in which said stationary contact means is formed by a reed switch and said movable contact means is a magnet movable with said side stand bar into and out of activating relation to said reed switch.

11. The position detecting switch according to claim 1 including a spring for biasing said side stand bar into the respective of said projecting position and said receiving position, said spring being attached at opposite ends with respect to said mounting bracket and said side stand bar respectively, and means connected between said spring and said movable contact means for positioning the latter in response to the disposition of said spring.

12. The position detecting switch according to claim 11 including a hook pin on said mounting bracket, said switch being positioned concentric with said hook pin, and a hook plate pivotably mounted on said hook pin, said hook plate attaching one end of said spring at one end and said movable contacts at the other end, whereby said movable contacts are moved in response to movement of said spring.

13. The position detecting switch according claim 12 including a switch case mounting said stationary contacts having an axially disposed boss containing an opening for reception on said hook pin, a rotor containing said movable contact rotatably mounted on said boss, and means on said rotor for connection with said hook plate, whereby said rotor is moved in response to movement of said spring.

14. The position detecting switch according to claim 13 in which said rotor and said hook plate are connected by a projection on said rotor in operative engagement with a recess in said hook plate.

15. The position detecting switch according to claim 1 wherein said pivot includes a headed shank for pivotally connecting said side stand bar to said mounting bracket, and means for securing said switch to the head of said shank.

16. The position detecting switch according to claim 15 wherein said securing means comprises a threaded opening in said shank and a screw engageable with said opening for securing said switch to said pivot.

17. The position detecting switch according to claim 15 wherein said headed shank contains an axial opening therethrough and said securing means comprises a connecting pin extending through said axial opening, and means at the end of said connecting pin to prevent withdrawal of said pin from said opening.

18. The position detecting switch according to claim 15 wherein said withdrawal-preventing means comprises resiliently expanded shoulders on the leading end of said connecting pin for engagement with the end of said shank.

19. The position detecting switch according to claim 15 wherein said withdrawal-preventing means comprises a C-clip attached to said connecting pin forming shoulder means engageable with the end of said shank.

20. The position detecting switch according to claim 15 wherein said withdrawal-preventing means comprises a member threadedly connected to the end of said connecting pin and having a shoulder surface engageable with the end of said shank.

21. The position detecting switch according to claim 20 wherein said member is a nut threadedly mounted on the end of said connecting pin.

22. The position detecting switch according to claim 20 wherein said member is a headed screw threadedly mounted on the end of said connecting pin.

23. The position detecting switch according to claim 15 wherein said securing means comprises a boss integrally formed on the head of said shank, and a C-clip connected to said boss for attaching said switch to said head of said shank.

* * * * *

UNITED STATES PATENT AND TRADEMARK OFFICE
CERTIFICATE OF CORRECTION

PATENT NO.   :   4,883,284
DATED        :   November 28, 1989
INVENTOR(S)  :   YOSHIHIRO NAKAZAWA et al.

It is certified that error appears in the above-identified patent and that said Letters Patent is hereby corrected as shown below:

In claim 10 (column 11, line 57) after "claim" insert -- 1 --.

Signed and Sealed this

Thirteenth Day of November, 1990

Attest:

HARRY F. MANBECK, JR.

*Attesting Officer*     *Commissioner of Patents and Trademarks*